United States Patent [19]

Deiss

[11] 4,266,579
[45] May 12, 1981

[54] HOSE AND METHOD OF MAKING SAME

[75] Inventor: Richard Deiss, Graham, Tex.

[73] Assignee: Dayco Corporation, Dayton, Ohio

[21] Appl. No.: 64,231

[22] Filed: Aug. 6, 1979

[51] Int. Cl.³ .............................................. F16L 11/08
[52] U.S. Cl. .................................... 138/127; 138/126;
138/130; 138/133; 156/143
[58] Field of Search ............... 138/127, 130, 133, 134,
138/138, 144, 172; 156/143, 169, 187, 425;
138/126

[56] References Cited

U.S. PATENT DOCUMENTS

| 360,371 | 9/1971 | Lejeune | 138/127 |
| 3,357,456 | 12/1967 | Grawey et al. | 138/127 |
| 4,174,984 | 11/1979 | Meadows | 156/143 |
| 4,175,992 | 11/1979 | Grawey | 156/143 |

*Primary Examiner*—Lenard A. Footland
*Attorney, Agent, or Firm*—Charles E. Bricker; Reuben Wolk

[57] ABSTRACT

A flexible wire-reinforced polymeric hose and method of making same are provided wherein such hose has a tubular core comprising a first polymeric tube, a tubular fabric layer disposed against the first tube and defined by a helically wound knitted fabric ribbon, and a second polymeric tube disposed against the tubular fabric layer and defined by a helically wound polymeric tape with the first and second polymeric tubes cooperating with the said tubular fabric layer to define the tubular core and hose having improved flexibility yet being capable of withstanding high fluid pressures within the hose.

14 Claims, 4 Drawing Figures

HOSE AND METHOD OF MAKING SAME

BACKGROUND OF THE INVENTION

1. Field of the Invention

This invention relates to a flexible wire-reinforced polymeric hose and method of making same.

2. Prior Art Statement

It is known in the art, as disclosed in U.S. Pat. No. 3,357,456 to Grawey et al, to provide a flexible wire-reinforced rubber hose and method of making same wherein such hose comprises a tubular core consisting of helically wound reinforcing tape means and at least two concentric wire plies comprising a first and second wire ply, the reinforcing tape means consisting of a reinforcing fabric laminated between two layers of uncured elastomer to define a laminate. Once this laminate is helically wound with side edge portions in overlapping relation as required to define a tubular core the reinforcing fabric defines a plurality of radially spaced roughly tubular portions having elastomer therebetween resulting in a comparatively stiff hose.

SUMMARY

It is a feature of this invention to provide a flexible wire reinforced polymeric hose having a tubular core which comprises a tubular fabric layer disposed between polymeric layers on opposite sides thereof.

Another feature of this invention is to provide a hose of the character mentioned in which the tubular fabric layer is essentially a single-thickness layer.

Another feature of this invention is to provide a hose of the character mentioned in which the tubular fabric layer is essentially a multiple thickness layer.

Another feature of this invention is to provide a flexible wire-reinforced polymeric hose having a tubular core comprising a first polymeric tube, a tubular fabric layer disposed against the first tube and defined by a helically wound knitted fabric ribbon, and a second polymeric tube disposed against the tubular fabric layer and defined by a helically wound polymeric tape with the first and second polymeric tubes cooperating with the tubular fabric layer to define the tubular core and hose having improved flexibility yet being capable of withstanding high fluid pressures within the hose. The fabric layer also provides a substantial member to prevent the outer wire plies from cutting through the hose.

Another feature of this invention is to provide a method of making a hose of the character mentioned comprising the steps of forming a first polymeric tube, helically winding a knitted fabric ribbon concentrically around and against the first polymeric tube to define a tubular fabric layer, and helically winding uncured polymeric tape around and against the tubular fabric layer to define a second polymeric tube, with the first and second polymeric tubes cooperating with the tubular fabric layer to define the tubular core and hose having improved flexibility yet being capable of withstanding high fluid pressure within the core and hose upon completing the overall hose by further build up outwardly of the tubular core and curing and cooling same.

Another feature of this invention is to provide an improved method of the character mentioned in which the step of helically winding a knitted fabric ribbon consists of helically winding such fabric ribbon with opposed side edges in substantially abutting relation to define a single-thickness tubular fabric layer.

Another feature of this invention is to provide an improved method of the character mentioned in which the step of helically winding a fabric ribbon consists of helically winding such fabric ribbon with opposed side edge portions in overlapping relation to define the tubular fabric layer having a plurality of thicknesses.

Therefore, it is an object of this invention to provide an improved flexible wire reinforced polymeric hose and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 2:
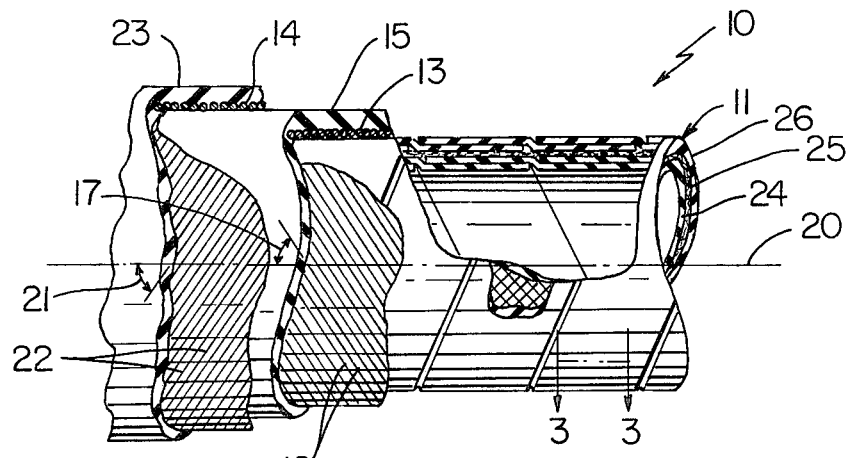
FIG. 2 is a view with parts in elevation, parts in cross section, and parts broken away illustrating an exemplary hose made employing the method of FIG. 1.

Reference is now made to FIG. 2 of the drawing which illustrates one exemplary embodiment of the wire reinforced hose of this invention which is designated generally by the reference numeral 10. The hose 10 comprises a tubular core 11 surmounted by at least two concentric wire plies shown in this example as a first wire ply 13 and a second wire ply 14 having a polymeric layer 15 disposed therebetween. The wire ply 13 consists of a plurality of individual wires wound in parallel side-by-side helical convolutions with a pair of typical convolutions being designated by the reference numeral 16 and the wire ply 13 is wound on the core at an agle 17 relative to a longitudinal axis 20 of the hose 10. The wire ply 14 is the next adjacent wire ply to wire ply 13 and consists of side-by-side helical convolutions 22 wound at an opposite angle 21 of a magnitude equal to the magnitude of the angle 17. The helical convolutions 22 of the wire ply 14 are, in essence, disposed transverse and cross the helical convolutions 16 of the wire ply 13 even though the convolutions have the polymeric layer 15 disposed therebetween.

Except for the tubular core 11, the hose 10 is very similar to the hose disclosed in the previously mentioned U.S. Pat. No. 3,357,456 and the disclosure of this patent for those portions of the hose and method of making same other than tubular core 11 are incorporated herein by reference. Accordingly, if more details than presented herein are desired regarding portions of hose 10 outwardly of the tubular core 11 such details may be obtained from the above mentioned patent.

In a similar manner as taught in the above patent, the hose 10 of this example preferably has helical convolutions 16 and 22 defining its wire plies 13 and 14 respectively disposed at angles 17 and 21 with the longitudinal axis 20 and angles 17 and 21 are substantially the same magnitude having a theoretical angle of 54° 44′. It has been proven mathematically that this is the optimum angle for such convolutions; however, in making the hose, this angle may vary roughly 1° on either side of the theoretical angle.

The hose 10 of this example is provided with an outer protective layer 23 made of a suitable polymeric material which is cross hatched as being rubber and with only two wire plies 13 and 14. Nevertheless, only one wire ply or more than two of such wire plies may be provided for the hose 10, as desired. In addition, the outer cover layer 23 may be made of any suitable polymeric material including rubber and synthetic plastic material.

As shown in the drawing, the core 11 comprises a first polymeric tube 24 defined by a first helically wound polymeric tape 24, a tubular fabric layer 25 disposed against the first tube 24 formed of a helically wound knitted fabric ribbon, and a second polymeric tube 26 defined by a second helically wound polymeric tape. In the completed hose 10, the polymeric tubes 24 and 26 cooperate with the tubular fabric layer 25 to define the tubular core 11 and assure hose 10 has improved flexibility (which is substantially greater than the flexibility of the hose disclosed in the above-mentioned patent) yet the hose 10 is capable of withstanding high fluid pressures within such hose whether the fluid is a gaseous fluid, a liquid, or a mixture of gas and liquid. The tubes 24 and 26 may be extruded tubular members instead of tape formed as shown.

The hose 10 of this invention has a single tubular fabric layer disposed between tubes 24 and 26 and the character of such fabric layer 25 may be precisely and economically controlled in the manufacturing of hose 10 as to the thickness of the fabric, type of fabric, and the like, with greater precision than is ordinarily possible when a rectangular fabric ribbon or strip is disposed or sandwiched as a central portion of a laminated structure or laminate ordinarily used to define a tubular core of the character disclosed in the above-mentioned patent. The hose 10 of FIG. 2 has its tubular fabric layer 25 defined having a plurality of thicknesses shown as a double thickness at 30 in FIG. 3; and, this double thickness is defined by the ribbon 25 which is helically wound with one half of a helical convolution being wound overlapping a half of an immediately previously wound convolution.

Figure 4:
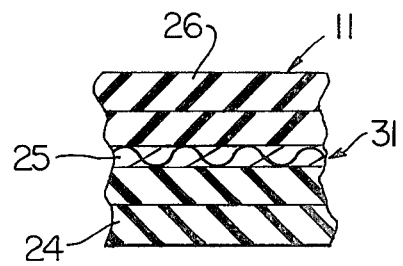
FIG. 4 is a view similar to FIG. 3 illustrating a modification of the tubular core of the hose of FIG. 2.

A modification of the tubular core portion 11 of hose 10 is shown in FIG. 4 and has it tubular fabric layer defined as a single-thickness layer as shown at 31. In defining such a single-thickness tubular fabric layer it will be appreciated that the fabric ribbon 25 is helically wrapped with its opposed side edges in substantially abutting relation. The remainder of the hose shown partially in FIG. 4 is identical to the hose 10 as shown in FIG. 2 and as described in connection with FIG. 2 and such description will not be repeated herein.

Figure 1:
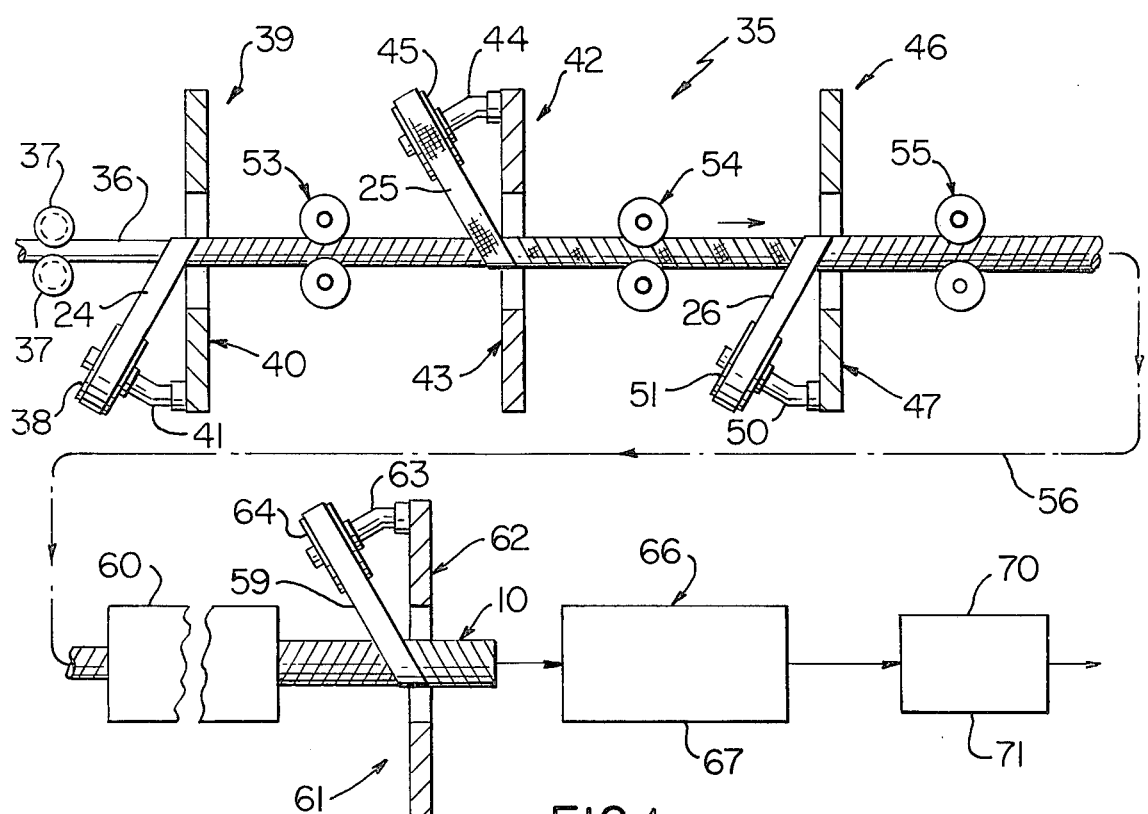
FIG. 1 is a view with parts in elevation, parts in cross section, parts broken away, and parts shown schematically illustrating the method of this invention and associated apparatus employed in carrying out such method and used in making one exemplary embodiment of the hose of this invention.

The hose construction or hose 10 may be made utilizing any suitable method known in the art; however, such hose is preferably made utilizing the method disclosed in FIG. 1 of the drawing and employing apparatus essentially as disclosed in FIG. 1 and such method is designated generally by the reference numeral 35. Basically, the novel method step of method 35 involves making the tubular core and such steps will now be described in detail. The tubular core 11 is defined by first helically winding a first uncured polymeric tape 24 with side portions thereof in overlapping relation to define the polymeric tube 24 and the tape 24 is helically wound around an associated rectilinearly movable mandrel 36 which is moved by a pair of cooperating driving rollers 37. The polymeric tape 24 is wound around the mandrel 36 at a winding station 39 to define a corresponding double-thickness uncured polymeric tube 24 by an associated winding head assembly 40 which is suitably rotated to provide the winding action of the tape 24. The winding head assembly 40 has a support 41 which rotatably supports a supply roll 38 of the tape 24 for unwinding rotation. However, this member 24 may instead be an extruded tube which is placed on the mandrel 36 prior to passing to the winding station 42, where the fabric ribbon 25 is applied.

The mandrel 36 with the uncured polymeric tube 24 thereon is advanced in a rectilinear manner to a winding station 42 where a knitted fabric ribbon 25 is helically wound concentrically around and against the tube 24 to define a double-thickness tubular fabric layer. The fabric ribbon 25 is wound at station 42 by a winding head assembly 43 which is suitably rotated about the mandrel 36 and tube 24 and the winding head 43 has a support 44 which rotatably supports a supply roll 45 of the fabric ribbon 25 for unwinding rotation.

The mandrel 36 with the uncured double-thickness tube 24 and double-thickness tubular fabric layer 25 wound therearound is then moved rectilinearly to another winding station 46 where an uncured polymeric tape 26 is helically wound with side edge portions thereof in overlapping relation by a winding head assembly 47 to define a double-thickness polymeric tube 26. The winding head assembly 47 is rotated by any suitable means known in the art and has a support 50 which rotatably supports a supply roll 51 of the tape 25 for unwinding rotation.

Suitable moving means is employed to move the mandrel 36 with the various tubular portions or tubes helically wrapped therearound in a rectilinear path to carry out the method of this invention. In addition to the set of cooperating grooved driving rollers 37 which engage the mandrel 36 upstream of winding station 39, a set 53 of cooperating grooved driving rollers is disposed between winding station 39 and 42 engaging tube 24, a set 54 of cooperating grooved driving rollers is disposed between winding station 42 and 46 engaging tubular fabric layer 25, and a set 55 of cooperating grooved driving rollers is disposed downstream of the winding station 46 engaging tube 26.

The hose construction consisting of the uncured tubular core portion 11 is continued downstream of roller set 55, as shown by dot-dash lines at 56, for the formation of the outer portion of the hose 10 to a wire and elastomer winding area which is designated schematically by a rectangular block 60. The area 60 comprises a plurality of stations which are basically of the type disclosed in the above-mentioned patent and reference may be made thereto for a better understanding thereof. In any event, sufficient description will now be presented for an understanding of this invention without need to refer to the mentioned patent.

At area 60 a plurality of wires are wound on the core 11 in parallel side-by-side helical convolutions at an angle of substantially 54° 44′ to the hose axis to form a first cylindrical wire ply which is the wire ply 13 illustrated in FIG. 2; and, the wire ply 13 has a wall thickness equal to the diameter of the wires employed.

The wire ply 13 is covered by a polymeric tubular layer 15 of uncured elastomer and this may be achieved by helically winding an uncured tape or ribbon 15 in a similar manner as described for the tapes 24 and 26.

After winding of the tape 15 is plurality of resilient wires are wound in parallel side-by-side helical convolutions also at an angle of substantially 54° 44' to the hose axis to form a second cylindrical wire ply which is the wire ply 14 shown in FIG. 2 in the completed hose 10. The second wire ply 14 also has a wall thickness equal to the diameter of its wires; however, the helical convolutions of the second wire ply 14 are wound at an angle opposite in sense or winding direction to the winding angle of the first wire ply 13.

Following the forming of the wire ply 14 a cover layer 23 is also made by helically winding an uncured tape in position against the wire ply 14 and this is achieved in the area 60.

Following the passage of the uncured hose construction through the area 60 with the various winding stations therein, such hose is wrapped with a nylon shrink tape 59 as is known in the art. The wrapping of tape 59 is achieved at a wrapping station 61 employing a wrapping head assembly 62. The assembly 62 has a support 63 which rotatably supports a supply roll 64 of the nylon shrink tape 59 for unwinding rotation.

The shrink tape wrapped construction is designated by the reference numeral 10 and such construction is introduced into curing station 56 where a heating device shown as a heating oven 67 heats the construction to a controlled temperature while it is tightly wrapped with the nylon tape 65 whereby the construction is vulcanized or cured. The cured hose construction is then introduced into a cooling station 70 for cooling purposes. At station 70 a cooling apparatus 71 of any suitable type known in the art may be used; however, if desired, cooling may be achieved simply by exposing the mandrel 36 and hose construction 10 to ambient air.

The completed hose construction or hose 10 exits the cooling station 70 whereupon such hose is stripped from the mandrel 36 using techniques known in the art. The hose 10 may then be cut into suitable lengths, as desired, for commercial use.

Although not specifically described previously, it is to be understood that the wrapping of the various uncured tapes and fabric ribbon is preferably achieved by wrapping such tapes and ribbon at the optimum theoretical angle of 54° 44', as in the case of the wire plies.

Figure 3:
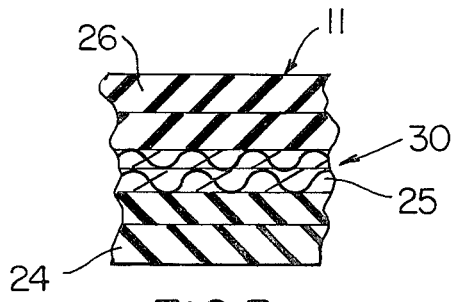
FIG. 3 is a cross-sectional view taken essentially on the line 3—3 of FIG. 2.

In the illustration of FIG. 1 the fabric ribbon 25 is helically wrapped with opposite side edge portions in overlapping relation to define the double-thickness tubular fabric layer 25 as shown in FIGS. 2 and 3; however, it will be appreciated that the wrapping action may be achieved to define a single-thickness layer as previously mentioned in connection with FIG. 4. Further, by providing more overlap, more than a double-thickness tubular fabric layer may be provided. Also, a plurality of fabric ribbons may be wrapped at successive stations to define any desired thickness for the tubular fabric layer.

The polymeric hose of this invention is preferably a hose made of any suitable polymeric material. However, in this disclosure of the invention the hose is shown as being made of rubber.

Thus, it is seen that in accordance with this invention an improved hose construction having improved flexibility is provided due to providing a tubular fabric layer substantially centrally within a tubular core of a hose which has been described as a so-called "hard core" hose. As described above the tubular fabric layer may have a single thickness or a plurality of thicknesses. Similarly, it will be appreciated that precise control may be provided of this tubular fabric layer to change the basic characteristics of the overall hose 10. For example, it may be desired in some applications of this invention to not only provide a winding of a fabric ribbon 25 in one direction but the pair of fabric ribbons may be wound at successive stations with one ribbon being wound in one direction or sense relative to the longitudinal axis of the hose and the other fabric ribbon wound at an opposite direction or sense.

The fabric ribbon 25 may be made of any suitable material employed in the art; however, preferably such ribbon is made of a suitable polyester.

In this disclosure of the invention, polymeric tapes 24 and 26 are shown essentially having the same thickness; however, it is to be understood that such tapes may have different thicknesses as desired and depending upon the characteristics which are desired to be imparted to the overall hose 10.

In this disclosure of the invention, the tapes 24 and 26, defining the corresponding polymeric tubes, are shown helically wrapped or wound in the same direction or sense relative to the longitudinal axis of the hose; however, it is to be understood such tapes may be wrapped in opposite directions, if desired.

While present exemplary embodiments of this invention, and methods of practicing the same, have been illustrated and described, it will be recognized that this invention may be otherwise variously embodied and practiced within the scope of the following claims.

What is claimed is:

1. In a flexible wire-reinforced polymeric hose comprising a tubular core and at least two concentric wire plies comprising a first and a second wire ply having a polymeric layer disposed therebetween; each ply consisting of a plurality of individual wires wound in parallel side-by-side helical convolutions; one of said wire plies being wound on said core at a particular angle relative to a longitudinal axis through said hose and the next adjacent wire ply being wound at an opposite angle of a magnitude equal to said particular angle; the improvement in said core comprising a first polymeric tube, a tubular fabric layer disposed against said first tube and defined by a helically wound knitted fabric ribbon, and a second polymeric tube disposed against said tubular fabric layer and defined by a helically wound polymeric tape, said first and second polymeric tubes cooperating with said tubular fabric layer to define said tubular core and hose having improved flexibility yet being capable of withstanding high fluid pressures within said hose, and preventing said wires from cutting through said hose.

2. A hose as set forth in claim 1 in which said tubular fabric layer is a single-thickness layer defined of a helically wrapped fabric strip having opposed edges in substantially abutting relation.

3. A hose as set forth in claim 1 in which said tubular fabric layer is a double-thickness layer defined by a helically wrapped fabric strip having opposed edge portions in overlapping relation.

4. A hose as set forth in claim 1 in which said fabric ribbon is polyester.

5. A hose as set forth in claim 1 in which said polymeric tubes are rubber.

6. A hose as set forth in claim 1 in which said fabric ribbon is polyester and said first and second polymeric tubes are rubber.

7. A hose as set forth in claim 6 in which each of said first and second tubes is a double-thickness tube having the same thickness.

8. A hose as set forth in claim 1 in which each of said first and second tubes is a double-thickness tube.

9. In a method of making a flexible wire-reinforced polymeric hose comprising the steps of forming a tubular core; winding a plurality of resilient wires on said core in parallel side-by-side helical convolutions to form a first cylindrical wire ply having a wall thickness equal to the diameter of its wires; covering said first cylindrical wire ply with a layer of uncured elastomer; winding a plurality of resilient wires on said layer in parallel side-by-side helical convolutions to form a second cylindrical wire ply having a wall thickness equal to the diameter of its wire; said helical convolutions of said second wire ply being wound at an angle opposite to the winding angle of the first wire layer; and vulcanizing the hose construction having said plies and layers comprising same; the improvement comprising the steps of forming a first polymeric tube, helically winding a fabric ribbon concentrically around and against said first polymeric tube to define a tubular fabric layer, and helically winding an uncured polymeric tape around and against said tubular fabric layer to define a second polymeric tube, said first and second polymeric tubes cooperating with said tubular fabric layer to define said tubular core and hose having improved flexibility yet being capable of withstanding high fluid pressure within said hose.

10. A method as set forth in claim 9 in which said step of helically wrapping the fabric layer comprises helically wrapping said fabric layer with opposed edges in abutting relation to define said tubular fabric layer is a single-thickness layer.

11. A method as set forth in claim 9 in which said step of helically wrapping said fabric layer comprises helically wrapping said fabric strip with opposed edge portions in overlapping relation to define said tubular fabric layer as a double-thickness layer.

12. A method as set forth in claim 9 achieved in a continuous uninterrupted process and comprising the further step of helically wrapping said hose with a shrink tape prior to said vulcanizing step.

13. A method as set forth in claim 12 in which said vulcanizing step is achieved in an oven at a controlled temperature.

14. A method as set forth in claim 9 in which each of said helically winding steps is achieved at an angle of substantially 54° 44′ relative to a longitudinal axis through said hose.

* * * * *